US009411136B2

(12) United States Patent
Ferraris

(10) Patent No.: US 9,411,136 B2
(45) Date of Patent: *Aug. 9, 2016

(54) IMAGE CAPTURING MODULE AND OPTICAL AUXILIARY UNIT THEREOF

(71) Applicant: LARVIEW TECHNOLOGIES CORP., Taoyuan County (TW)

(72) Inventor: Charles Ian Daduya Ferraris, Taoyuan County (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 41 days.

This patent is subject to a terminal disclaimer.

(21) Appl. No.: 14/066,236

(22) Filed: Oct. 29, 2013

(65) Prior Publication Data

US 2015/0116575 A1 Apr. 30, 2015

(51) Int. Cl.
*G02B 13/00* (2006.01)
*H04N 5/225* (2006.01)
*G02B 3/00* (2006.01)
*G02B 7/08* (2006.01)

(52) U.S. Cl.
CPC .......... *G02B 13/0055* (2013.01); *H04N 5/2254* (2013.01); *G02B 3/0037* (2013.01); *G02B 7/08* (2013.01)

(58) Field of Classification Search
CPC . H04N 5/2253; H04N 5/2254; H04N 5/2252; G08B 13/19628; G08B 13/19626; G08B 13/0055; G02B 7/04; G02B 7/105; G02B 7/08; G02B 3/0037; G02B 5/23
USPC ........................................................ 348/340
See application file for complete search history.

(56) References Cited

U.S. PATENT DOCUMENTS

| 8,773,573 | B1* | 7/2014 | Saeedi | G02B 3/0081 348/340 |
| 9,036,078 | B1* | 5/2015 | D'Amico | H04N 5/353 348/207.99 |
| 2006/0044450 | A1* | 3/2006 | Wolterink | G02B 13/006 348/340 |
| 2007/0047938 | A1* | 3/2007 | Suzuki | G02B 7/023 396/89 |
| 2007/0279520 | A1* | 12/2007 | Lee | H01L 27/14618 348/374 |
| 2008/0246866 | A1* | 10/2008 | Kinoshita | G02B 7/02 348/294 |
| 2009/0014824 | A1* | 1/2009 | Sakoh | H01L 27/14636 257/432 |
| 2010/0220229 | A1* | 9/2010 | Sano | G02B 13/0045 348/340 |
| 2012/0062771 | A1* | 3/2012 | Ueno | H04N 13/0232 348/294 |
| 2012/0183288 | A1* | 7/2012 | Kishinami | G02B 13/003 396/505 |
| 2013/0070148 | A1* | 3/2013 | Kim | G02B 7/08 348/357 |
| 2013/0076966 | A1* | 3/2013 | Border | H04N 5/23245 348/345 |

(Continued)

Primary Examiner — Pritham Prabhakher
(74) Attorney, Agent, or Firm — Li & Cai Intellectual Property (USA) Office

(57) ABSTRACT

An image capturing module includes an image sensing unit and an optical auxiliary unit. The image sensing unit includes a carrier substrate and an image sensing chip disposed on the carrier substrate and electrically connected to the carrier substrate. The optical auxiliary unit includes a housing frame for covering the image sensing chip and a movable lens assembly movably disposed in the housing frame. The movable lens assembly includes a movable casing movably disposed in the housing frame, at least one optical lens group disposed in the movable casing, a microlens array substrate disposed in the movable casing, and a nonconductive photosensitive film layer disposed on the microlens array substrate for increasing the light absorption capability.

8 Claims, 4 Drawing Sheets

(56) References Cited

U.S. PATENT DOCUMENTS

| | | | |
|---|---|---|---|
| 2013/0270419 A1* | 10/2013 | Singh | H01L 27/14618 250/208.1 |
| 2013/0278813 A1* | 10/2013 | Ogasahara | H04N 5/2254 348/345 |
| 2014/0118516 A1* | 5/2014 | Suzuki | H04N 5/2257 348/65 |

* cited by examiner

IMAGE CAPTURING MODULE AND OPTICAL AUXILIARY UNIT THEREOF

BACKGROUND OF THE INVENTION

1. Field of the Invention

The instant disclosure relates to an image capturing module and an optical auxiliary unit thereof, and more particularly to an image capturing module and an optical auxiliary unit thereof for increasing the image quality.

2. Description of Related Art

Recently, it becomes more and more popular for portable devices such as mobile phones or PDA to be equipped with an imaging module. Furthermore, since the market requires these portable devices to have more powerful functions and smaller sizes, it is necessary for the imaging module to generate high quality pictures and to be of small size accordingly. One improvement of picture quality is to increase the number of pixel. The pixel number of an imaging module has already increased from the VGA-level 30 pixels to 2, 5, 8, 13 or even 41 million pixels, which is now common in the market. Another improvement lies in the definition of the image. Thus, the imaging module of a portable device also develops from a fixed-focus mode to auto-focus mode or even optical zoom mode.

The auto-focus mode employs the principle of moving the lens in the imaging module suitably according to various distances of targets, whereby the optical image of the desired target can be focused correctly on an image sensor so as to generate a clear image. The common ways of activating the lens to move in the imaging module include activating by a stepping motor, piezoelectric motor and voice coil motor (VCM). However, when light source is not enough, the image quality provided by the imaging module would be decreased.

SUMMARY OF THE INVENTION

One aspect of the instant disclosure relates to an image capturing module and an optical auxiliary unit of the image capturing module for increasing the image quality.

One of the embodiments of the instant disclosure provides an image capturing module, comprising: an image sensing unit and an optical auxiliary unit. The image sensing unit includes a carrier substrate and an image sensing chip disposed on the carrier substrate and electrically connected to the carrier substrate. The optical auxiliary unit includes a housing frame for covering the image sensing chip and a movable lens assembly movably disposed in the housing frame, wherein the movable lens assembly includes a movable casing movably disposed in the housing frame, at least one optical lens group disposed in the movable casing, a microlens array substrate disposed in the movable casing, and a nonconductive photosensitive film layer disposed on the microlens array substrate for increasing the light absorption capability.

Another one of the embodiments of the instant disclosure provides an optical auxiliary unit applied to an image sensing unit, comprising: a housing frame and a movable lens assembly. The movable lens assembly is movably disposed in the housing frame, wherein the movable lens assembly includes a movable casing movably disposed in the housing frame, at least one optical lens group disposed in the movable casing, a microlens array substrate disposed in the movable casing, and a nonconductive photosensitive film layer disposed on the microlens array substrate for increasing the light absorption capability.

More precisely, the microlens array substrate includes a light-transmitting substrate disposed in the movable casing and a microlens array disposed on the bottom surface of the light-transmitting substrate for directly facing a cover glass disposed on the housing frame or corresponding to the image sensing unit, the microlens array is composed of a plurality of micro lenses separated from each other by a predetermined distance and design. And, the nonconductive photosensitive film layer is disposed on the top surface of the light-transmitting substrate for correspondingly facing the at least one optical lens group.

More precisely, the microlens array substrate includes a light-transmitting substrate disposed in the movable casing and a microlens array disposed on the bottom surface of the light-transmitting substrate for correspondingly facing the at least one optical lens group, the microlens array is composed of a plurality of micro lenses separated from each other by a predetermined distance, and the nonconductive photosensitive film layer is disposed on the top surface of the light-transmitting substrate and correspondingly opposite to the at least one optical lens group.

More precisely, the at least one optical lens group includes a first lens unit and a second lens unit, the microlens array substrate includes a light-transmitting substrate disposed in the movable casing and between the first lens unit and the second lens unit and a microlens array disposed on the bottom surface of the light-transmitting substrate for correspondingly facing the first lens unit, the microlens array is composed of a plurality of micro lenses separated from each other by a predetermined distance and design. And, the nonconductive photosensitive film layer is disposed on the top surface of the light-transmitting substrate for correspondingly facing the second lens unit.

Therefore, because "the microlens array substrate is disposed in the movable casing" and "the nonconductive photosensitive film layer is disposed on the microlens array substrate for increasing the light absorption capability" are used in the same image capturing module and the same optical auxiliary unit, the image quality of the instant disclosure can be increased.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

First Embodiment

Figure 1:
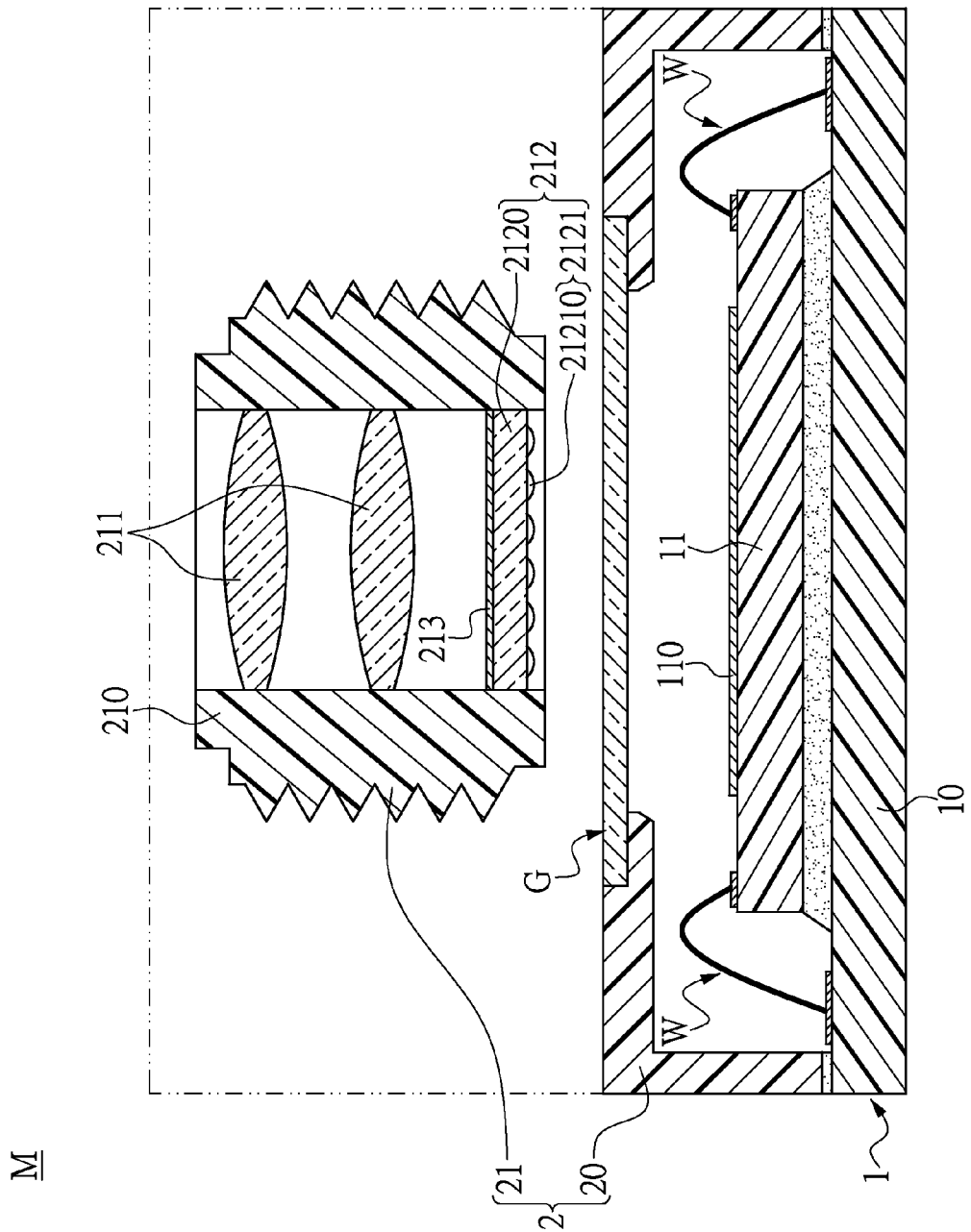
FIG. 1 shows a lateral, cross-sectional, schematic view of the image capturing module according to the first embodiment of the instant disclosure.
Figure 2:
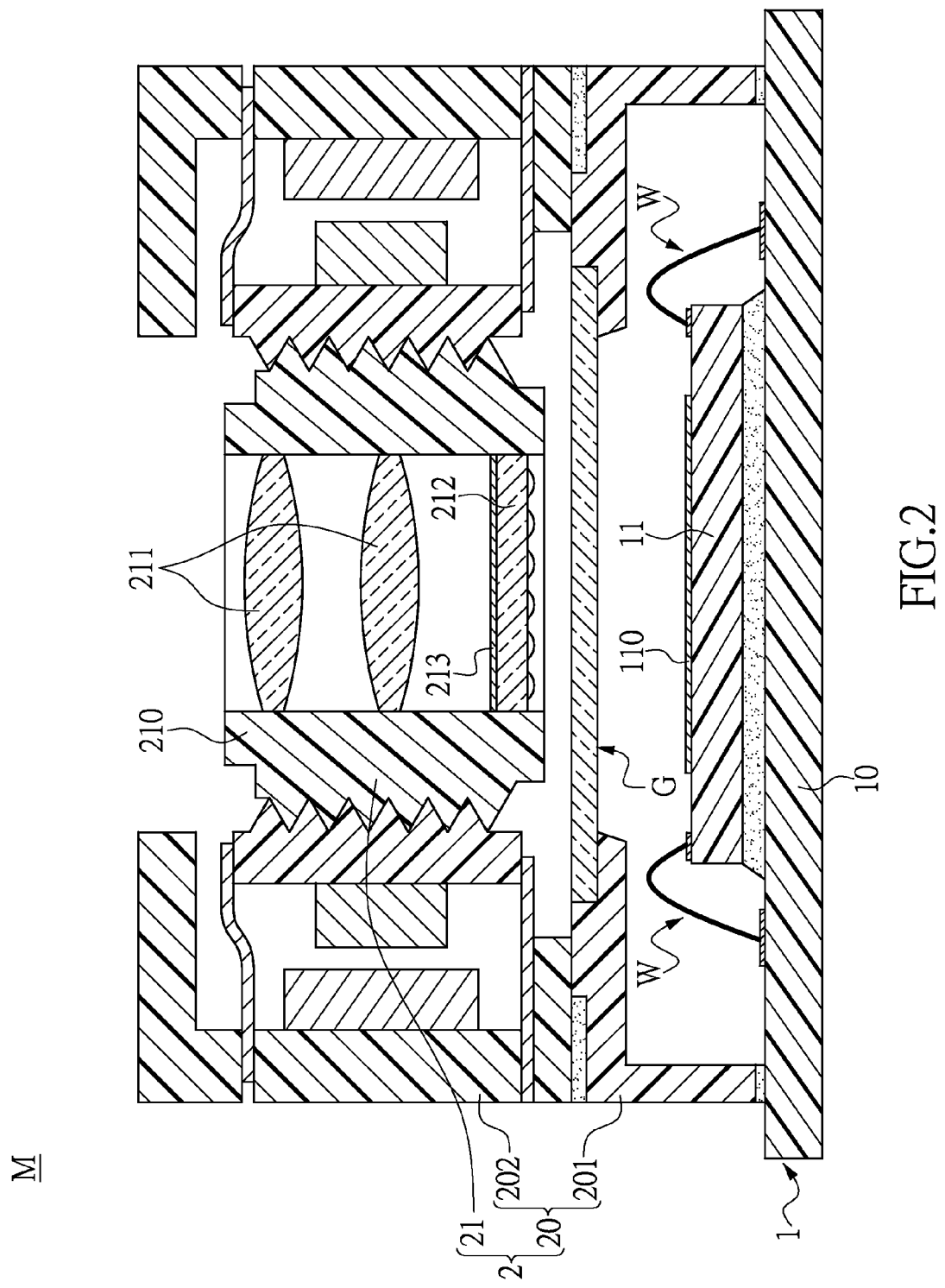
FIG. 2 shows a lateral, cross-sectional, schematic view of the image capturing module using a voice coil actuator according to the first embodiment of the instant disclosure.

Referring to FIG. 1 and FIG. 2, where the first embodiment of the instant disclosure provides an image capturing module M, comprising: an image sensing unit 1 and an optical auxiliary unit 2.

First, the image sensing unit 1 includes a carrier substrate 10 and an image sensing chip 11 (such as an image sensor) disposed on the carrier substrate 10 and electrically connected to the carrier substrate 10, and the image sensing chip 11 has an image sensing area 110 disposed on the top side of the image sensing chip 11 for sensing or capturing images. For example, the image sensing chip 11 can be adhesively disposed on the carrier substrate 10 through any type of adhesive material (not labeled) such as UV adhesive glue, thermosetting glue or oven curing glue etc. In addition, the carrier substrate 10 may be a circuit substrate having a plurality of conductive pads (not labeled) disposed on the top surface of the circuit substrate, and the image sensing chip 11 has a plurality of conductive pads (not labeled) disposed on the top surface of the image sensing chip 11. Each conductive pad of the image sensing chip 11 can be electrically connected to the corresponding conducive pad of the carrier substrate 10 through the corresponding conducive wire W, thus the image sensing chip 11 can be electrically connected with the carrier substrate 10 through the conductive wires W.

Furthermore, the optical auxiliary unit 2 includes a housing frame 20 (such as a sensor holder) with an attached cover glass G (such as IR/AR coated glass or blue glass) for covering the image sensing chip 11 and a movable lens assembly 21 movably disposed in the housing frame 20. The movable lens assembly 21 includes a movable casing 210 movably disposed in the housing frame 20, at least one optical lens group 211 disposed in the movable casing 210, a microlens array substrate 212 disposed in the movable casing 210, and a nonconductive photosensitive film layer 213 disposed in the movable casing 210 and on the microlens array substrate 212 for increasing the light absorption capability. More precisely, the microlens array substrate 212 includes a light-transmitting substrate 2120 disposed in the movable casing 210 and a microlens array 2121 disposed on the bottom surface of the light-transmitting substrate 2120 for directly facing the cover glass G disposed on the housing frame 20 or corresponding to the image sensing unit 1. The microlens array 2121 may be composed of a plurality of micro lenses 21210 separated from each other by a predetermined distance and design. The nonconductive photosensitive film layer 213 is disposed on the top surface of the light-transmitting substrate 2120 for correspondingly facing the optical lens group 211, and nonconductive photosensitive film layer 213 is adjacent to the optical lens group 211.

Whereby, the nonconductive photosensitive film layer 213 can be used to efficiently guide light source to the micro lenses 21210 of the microlens array 2121 of the microlens array substrate 212, thus the image quality (such as the sharpness and the resolution) provided by the image sensing unit 1 can be increased by matching the microlens array substrate 212 and the nonconductive photosensitive film layer 213.

For example, the housing frame 20 can be adhesively disposed on the carrier substrate 10 through any type of adhesive material (not labeled) such as UV adhesive glue, thermosetting glue or oven curing glue etc. Both the optical lens group 211 and the microlens array substrate 212 are fixed in the movable casing 210, and the optical lens group 211 can be composed of a plurality of optical lenses, where this embodiment uses two optical lenses as the optical lens group 211 as shown in FIG. 1. Furthermore, the nonconductive photosensitive film layer 213 may be made of any type of nano-material for increasing the light absorption capability, and the nonconductive photosensitive film layer 213 can be disposed on the microlens array substrate 212 by laminating, coating, spraying or sputtering etc. In addition, the optical auxiliary unit 2 may be a voice coil actuator, but the voice coil actuator used in the first embodiment is merely an example and is not meant to limit the instant disclosure. The housing frame 20 includes a first holder 201 disposed on the carrier substrate 10 and a second holder 202 disposed on the first holder 201, the image sensing chip 11 is disposed in the first holder 201 of the housing frame 20, and the movable lens assembly 21 is movably disposed in the second holder 202 of the housing frame 20. However, the optical auxiliary unit 2 used in the first embodiment is merely an example and is not meant to limit the instant disclosure. For example, the optical auxiliary unit 2 can be composed of a fixed plastic holder and a fixed lens assembly fixedly disposed in the fixed plastic holder through fastening glue.

Second Embodiment

Figure 3:
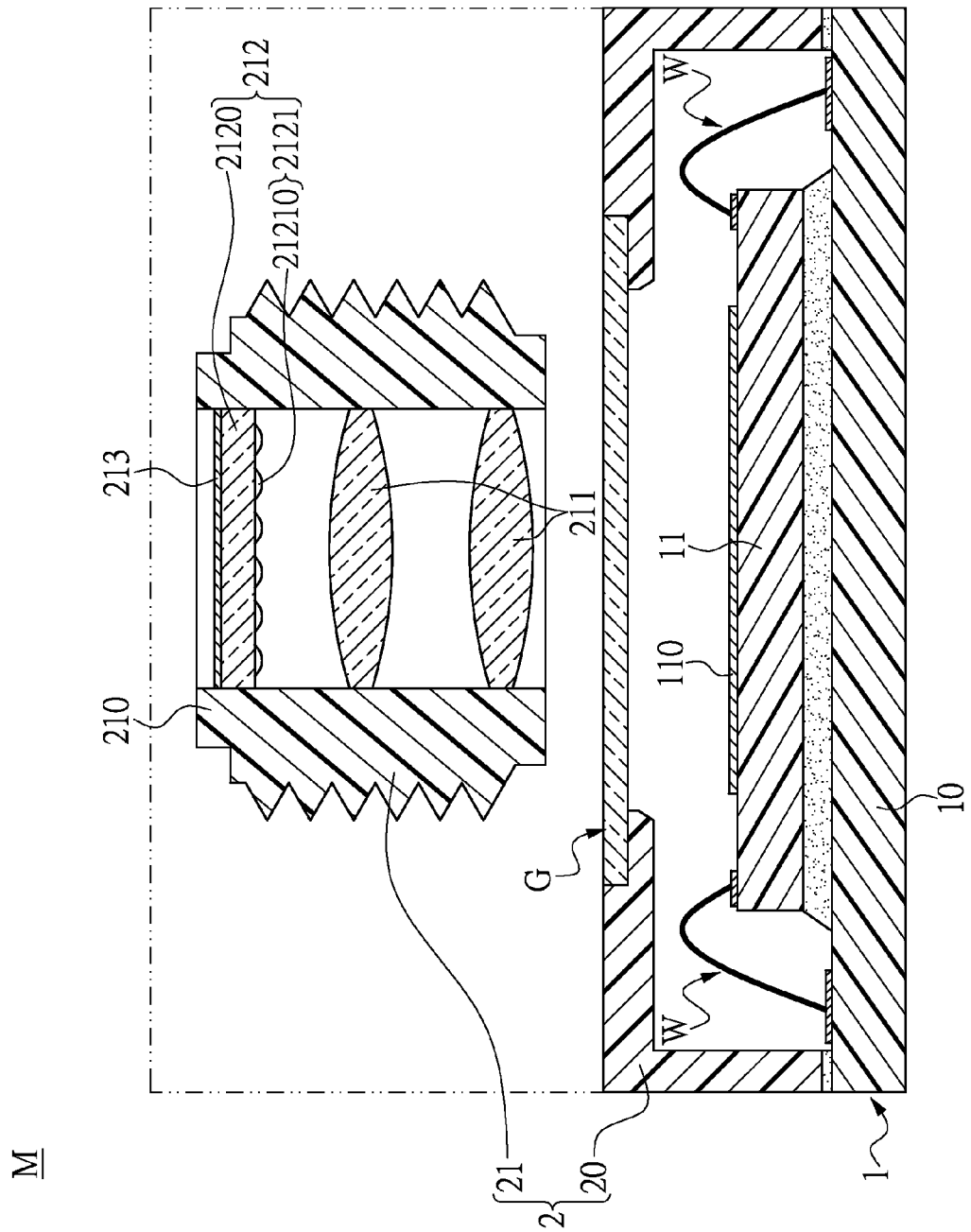
FIG. 3 shows a lateral, cross-sectional, schematic view of the image capturing module according to the second embodiment of the instant disclosure.

Referring to FIG. 3, where the second embodiment of the instant disclosure provides an image capturing module M, comprising: an image sensing unit 1 and an optical auxiliary unit 2. Comparing FIG. 3 with FIG. 1, the difference between the second embodiment and the first embodiment is as follows: in the second embodiment, the microlens array substrate 212 includes a light-transmitting substrate 2120 disposed in the movable casing 210 and a microlens array 2121 disposed on the bottom surface of the light-transmitting substrate 2120 for correspondingly facing the optical lens group 211, and the light-transmitting substrate 2120 is adjacent to the optical lens group 211. In addition, the microlens array 2121 may be composed of a plurality of micro lenses 21210 separated from each other by a predetermined distance and design. And, the nonconductive photosensitive film layer 213 is disposed on the top surface of the light-transmitting substrate 2120 and correspondingly opposite to the optical lens group 211. In other words, the nonconductive photosensitive film layer 213 can be disposed under the optical lens group 211 and adjacent to the bottom side of the movable casing 210 (shown as the first embodiment in FIG. 1), or disposed above the optical lens group 211 and adjacent to the top side of the movable casing 210 (shown as the second embodiment in FIG. 3), according to different requirements.

Third Embodiment

Figure 4:
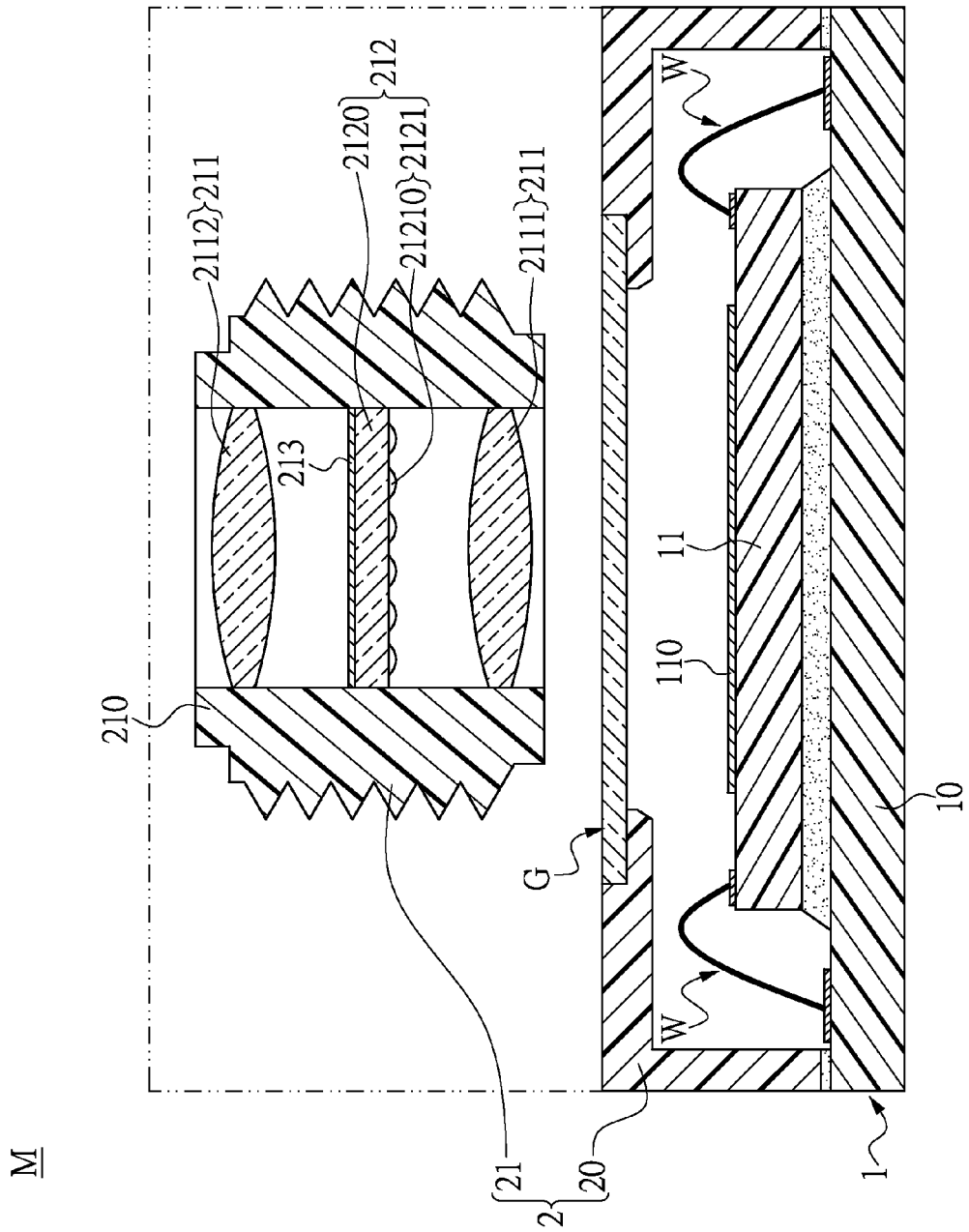
FIG. 4 shows a lateral, cross-sectional, schematic view of the image capturing module according to the third embodiment of the instant disclosure.

Referring to FIG. 4, where the third embodiment of the instant disclosure provides an image capturing module M, comprising: an image sensing unit 1 and an optical auxiliary unit 2. Comparing FIG. 4 with FIG. 1, the difference between the third embodiment and the first embodiment is as follows: in the third embodiment, the optical lens group 211 includes a first lens unit 2111 and a second lens unit 2112, and this embodiment uses an optical lens as the first lens unit 2111 and uses another optical lens as the second lens unit 2112 as shown in FIG. 4. The microlens array substrate 212 includes a light-transmitting substrate 2120 disposed in the movable casing 210 and between the first lens unit 2111 and the second lens unit 2112 and a microlens array 2121 disposed on the bottom surface of the light-transmitting substrate 2120 for correspondingly facing the first lens unit 2111. In addition, the microlens array 2121 may be composed of a plurality of micro lenses 21210 separated from each other by a predetermined distance and design. And, the nonconductive photosensitive film layer 213 is disposed on the top surface of the light-transmitting substrate 2120 for correspondingly facing the second lens unit 2112. In other words, the nonconductive photosensitive film layer 213 can be disposed under the optical lens group 211 and adjacent to the bottom side of the movable casing 210 (shown as the first embodiment in FIG. 1), or disposed above the optical lens group 211 and adjacent to the top side of the movable casing 210 (shown as the second embodiment in FIG. 3), or disposed between the first lens unit 2111 and the second lens unit 2112 (shown as the third embodiment in FIG. 4), according to different requirements.

In conclusion, because "the microlens array substrate 212 is disposed in the movable casing 210" and "the nonconductive photosensitive film layer 213 is disposed on the microlens array substrate 212 for increasing the light absorption capability" are used in the same image capturing module M and the same optical auxiliary unit 2, the image quality of the instant disclosure can be increased.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. An image capturing module, comprising:
    an image sensing unit including a carrier substrate and an image sensing chip disposed on the carrier substrate and electrically connected to the carrier substrate; and
    an optical auxiliary unit including a housing frame for covering the image sensing chip and a movable lens assembly movably disposed in the housing frame, wherein the movable lens assembly includes a movable casing movably disposed in the housing frame, at least one optical lens group disposed in the movable casing, a microlens array substrate disposed in the movable casing, and a nonconductive photosensitive film layer disposed in the movable casing and on the microlens array substrate for increasing the light absorption capability;
    wherein all of the at least one optical lens group, the microlens array substrate, and the nonconductive photosensitive film layer are fixedly disposed in the movable casing, and all of the at least one optical lens group, the microlens array substrate, and the nonconductive photosensitive film layer are concurrently moved by moving the movable casing,
    wherein the microlens array substrate includes a light-transmitting substrate disposed in the movable casing and a microlens array disposed on the bottom surface of the light-transmitting substrate for correspondingly facing the at least one optical lens group, the microlens array is composed of a plurality of micro lenses separated from each other, and the nonconductive photosensitive film layer is disposed on the top surface of the light-transmitting substrate and correspondingly opposite to the at least one optical lens group.

2. The image capturing module of claim 1, wherein the at least one optical lens group includes a first lens unit and a second lens unit, the microlens array substrate includes a light-transmitting substrate disposed in the movable casing and between the first lens unit and the second lens unit and a microlens array disposed on the bottom surface of the light-transmitting substrate for correspondingly facing the first lens unit, the microlens array is composed of a plurality of micro lenses separated from each other, and the nonconductive photosensitive film layer is disposed on the top surface of the light-transmitting substrate for correspondingly facing the second lens unit.

3. The image capturing module of claim 1, wherein the housing frame includes a first holder disposed on the carrier substrate and a second holder disposed on the first holder, the image sensing chip is disposed in the first holder of the housing frame, and the movable lens assembly is movably disposed in the second holder of the housing frame, wherein the at least one optical lens group and the microlens array substrate are fixed in the movable casing, and the at least one optical lens group is composed of a plurality of optical lenses.

4. An optical auxiliary unit applied to an image sensing unit, comprising:
    a housing frame; and
    a movable lens assembly movably disposed in the housing frame, wherein the movable lens assembly includes a movable casing movably disposed in the housing frame, at least one optical lens group disposed in the movable casing, a microlens array substrate disposed in the movable casing, and a nonconductive photosensitive film layer disposed in the movable casing and on the microlens array substrate for increasing the light absorption capability;
    wherein all of the at least one optical lens group, the microlens array substrate, and the nonconductive photosensitive film layer are fixedly disposed in the movable casing, and all of the at least one optical lens group, the microlens array substrate, and the nonconductive photosensitive film layer are concurrently moved by moving the movable casing,
    wherein the microlens array substrate includes a light-transmitting substrate disposed in the movable casing and a microlens array disposed on the bottom surface of the light-transmitting substrate for correspondingly facing the at least one optical lens group, the microlens array is composed of a plurality of micro lenses separated from each other, and the nonconductive photosensitive film layer is disposed on the top surface of the light-transmitting substrate and correspondingly opposite to the at least one optical lens group.

5. The optical auxiliary unit of claim 4, wherein the at least one optical lens group includes a first lens unit and a second lens unit, the microlens array substrate includes a light-transmitting substrate disposed in the movable casing and between the first lens unit and the second lens unit and a microlens array disposed on the bottom surface of the light-transmitting substrate for correspondingly facing the first lens unit, the microlens array is composed of a plurality of micro lenses separated from each other, and the nonconductive photosensitive film layer is disposed on the top surface of the light-transmitting substrate for correspondingly facing the second lens unit.

6. The optical auxiliary unit of claim 4, wherein the housing frame includes a first holder disposed on the image sensing unit and a second holder disposed on the first holder, the image sensing unit is disposed in the first holder of the housing frame, and the movable lens assembly is movably disposed in the second holder of the housing frame, wherein the at least one optical lens group and the microlens array substrate are fixed in the movable casing, and the at least one optical lens group is composed of a plurality of optical lenses.

7. The optical auxiliary unit of claim 4, wherein the at least one optical lens group, the microlens array substrate, and the nonconductive photosensitive film layer are carried by the movable casing, so that the at least one optical lens group, the microlens array substrate, and the nonconductive photosensitive film layer are moved concurrently through the movable casing.

8. The optical auxiliary unit of claim 4, further comprising a cover glass disposed between the image sensing unit and the movable lens assembly, and the optical lens group, the microlens array substrate, and the nonconductive photosensitive film layer of the movable lens assembly are disposed beside the same side of the cover glass.

\* \* \* \* \*